Aug. 6, 1935.  J. N. BROWNING  2,010,451

BUSHING

Filed July 19, 1934   2 Sheets-Sheet 1

*INVENTOR*
JOHN N. BROWNING
BY
Brockett, Hyde, Higley & Meyer
*ATTORNEYS*

Aug. 6, 1935.                J. N. BROWNING                2,010,451
BUSHING
Filed July 19, 1934          2 Sheets-Sheet 2

INVENTOR
JOHN N. BROWNING
BY
Brockett, Hyde, Higley & Meyer
ATTORNEYS

Patented Aug. 6, 1935

2,010,451

UNITED STATES PATENT OFFICE 2,010,451

BUSHING

John N. Browning, Maysville, Ky., assignor to General Fibre Products, Incorporated, Indianapolis, Ind., a corporation of Indiana Application July 19, 1934, Serial No. 735,978

4 Claims. (Cl. 287—52.05)

This invention relates to bushings adapted to provide driving relation between hub and shaft parts, the term "hub" being here employed to indicate generally the member fitting about the bushing, such as the hub part of a pulley gear or the like, and the term "shaft" being here used to indicate that part within the bushing and upon which the hub member is mounted and usually also centered by the bushing.

An object of the invention is to provide a bushing which may be thin and may be made by a die-casting operation with a minimum of subsequent necessary finishing. Another object is to provide that the driving relation established by the bushing shall have the maximum strength. And another object is to provide that the parts when assembled as in service shall have an improved interlocking relation, yet one attained in a very simple arrangement.

Figure 3:
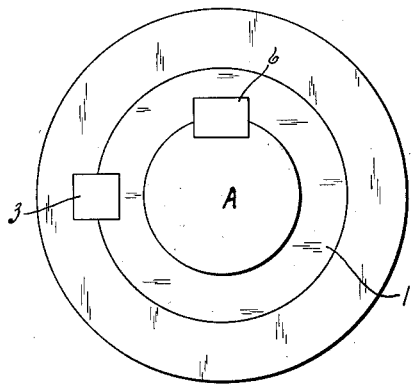
Figure 4:
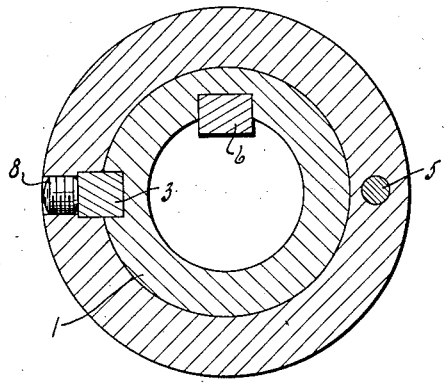
Figure 1:
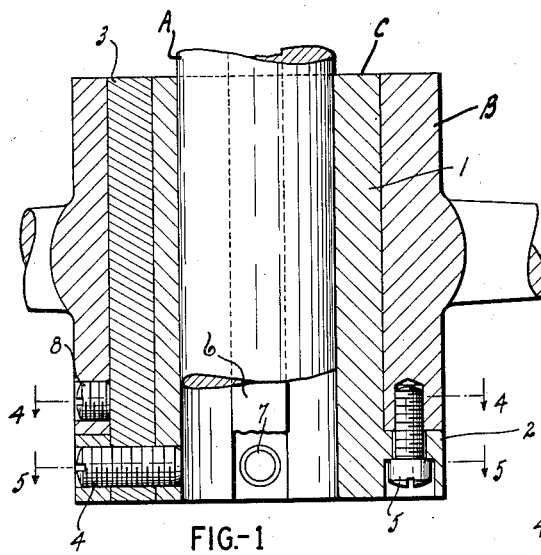
Figure 5:
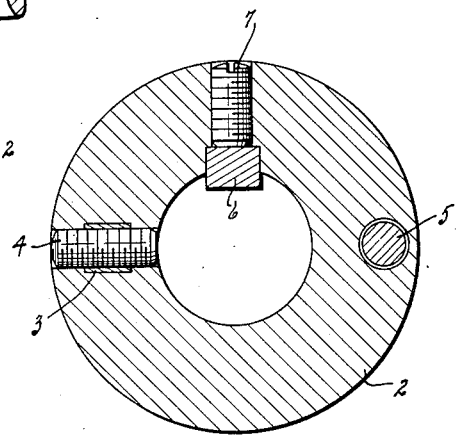
Figure 2:
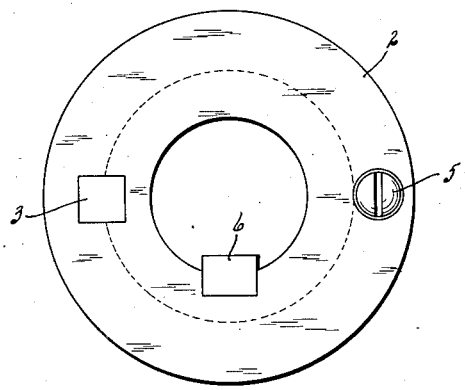
Figure 6:
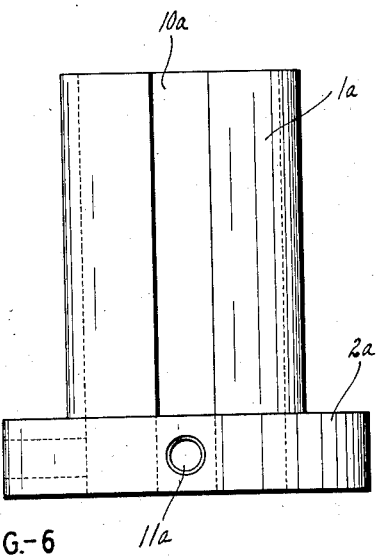
Figure 9:
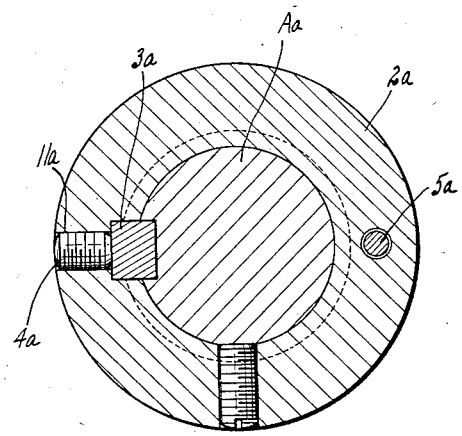

The exact nature of the invention together with further objects and advantages thereof will be apparent from the following description taken in connection with the accompanying drawings, all of which are assembly views illustrating the structural relationship of the bushing with the principal hub and shaft parts which it interconnects, together with other parts of the assembly; and in which, more particularly, Fig. 1 is a typical longitudinal section; Figs. 2 and 3 are end views of the same; Figs. 4 and 5 are respectively transverse sections in the planes of lines 4—4 and 5—5 respetcively, Fig. 1; Figs. 6 to 9 are views illustrating a modification wherein the bushing is a thin one, Fig. 6 showing the bushing, Fig. 7 being a typical longitudinal section of an assembly employing the bushing and Figs. 8 and 9 being transverse sections in the planes of lines 8—8 and 9—9 respectively, Fig. 7.

With reference now to the drawings and first to Figs. 1 to 5 thereof, A indicates the shaft member, and B the hub of the part which is to be mounted thereon. C indicates generally the bushing, which has a shank part 1 preferably longitudinally coextensive with the hub B, disposed within the hub and about the shaft A, and has a flange or head part 2 at the end of the hub part B. It will be appreciated that the parts thus far described are all generally cylindrical and aligned, usually concentrically, the bushing fitting the shaft A throughout the bushing length, fitting the hub B preferably throughout the length of the latter and the flange part of the bushing immediately overlying the end of the hub.

That the bushing may be maintained in its assembled relation with the hub B, a cap screw 5 is employed passing through an opening in the bushing flange 2, which opening is preferably countersunk to receive the head of the cap screw, and threaded into a suitable opening in the end of the hub B, all as indicated in Fig. 1.

That there may be amply effective driving relation between the hub and bushing, these parts are provided with cooperative keyways to receive a key 3 which may be preferably longitudinally coextensive with the bushing C. Thus the keyway in the hub B and in the flange part of the bushing C, both comprise grooves as indicated, Figs. 3 and 4, whereas the bushing at its flange part 2 is provided with an opening which may preferably be a through opening, in continuation of both said groove openings, as indicated Figs. 1, 2 and 5, so that the key 3 may be of uniform rectangular section throughout its length. The key is fitted by the parts which receive it as described.

That the key 3 may be longitudinally secured, the head part 2 of the bushing is provided with an opening to receive a radially disposed screw 4, arranged to pass through the key 3, which latter is provided with an opening for the purpose. These screw-receiving openings in at least the bushing or the key 3, are threaded to receive the screw 4. As indicated in Figs. 1 and 5, the screw may be turned against the shaft A with considerable effect to connect the bushing with the shaft, as the key 3 will act upon the screw somewhat as a lock nut. Also, the screw 4 maintains the key 3 in assembly with the bushing as a convenient unit for sales and handling.

That the key 3 may be otherwise longitudinally secured when desired, the usual set screw 8 may be provided, threaded into the hub B and turned against the key.

The shaft and bushing may have driving interconnection by a key 6, key-way provision being made on the shaft and the interior of the bushing for the purpose, as indicated in the drawings. A set screw 7 may be provided in the bushing flange part 2, to longitudinally secure the key 6.

In practice it will be appreciated that the shaft and hub parts A and B will usually be of ferrous metals, the key and screws of steel. The bushing itself, however, by the arrangement described, may be and is intended to be, a die-casting which need not be finished by machining. Particularly, the rectangular opening in the bushing, to receive the key 3, may be produced in the bushing as by coring. Of course, if desired, the bushing may be otherwise finished.

Figure 7:
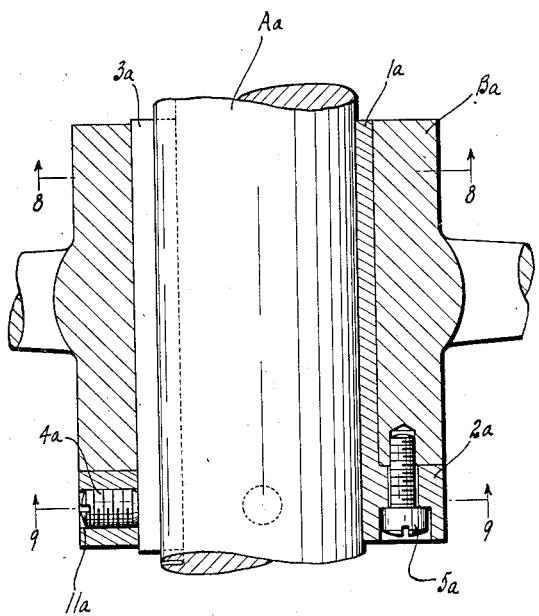
Figure 8:
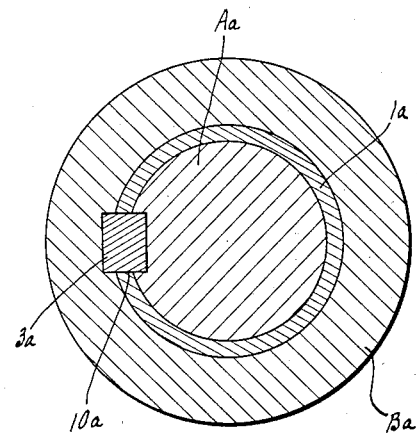

With reference now to the modification of Figs. 6 to 9, the bushing is one whose shank part 1a is thin, that is, of slight radial dimension, the flange or head part 2a being generally as before. For key-way the shank part 1a of the bushing is simply split as at 10a to receive the key 3a between the longitudinally extending ends at the split as indicated in Fig. 8. The flange part 2a of the bushing has a longitudinally extending opening to receive the key 3a, and a radially extending opening 11a intersecting its key-receiving opening, threaded to receive a set screw 4a.

The assembly will be generally as before, the bushing being disposed upon a shaft Aa to secure thereon a hub part Ba of a pulley or the like, the shank part 1a of the bushing extending between the shaft and hub, and the flange part 2a of the bushing being disposed at the end of the hub and there secured as before, as by the screw 5a. As illustrated in Figs. 7 and 8, both shaft and hub are provided with shallow key-ways to receive the corresponding parts of the key 3a which seats in each, as well as in the split of the bushing shank.

What I claim is:

1. A bushing having shank and flange parts, said bushing shank part having an external key-way, a key positioned in said keyway and extending into the zone of said bushing flange part, said flange part having an opening receiving said extending key part, said key and bushing having aligned openings radially extending in said zone, and means arranged in said opening to secure said key against motion along said keyway.

2. A bushing having shank and flange parts, said bushing shank part having a keyway, a key positioned in said keyway and extending into the zone of said bushing flange part, said flange part having an opening receiving said extending key part, said key and bushing having aligned openings radially extending in said zone, and screw means arranged in said openings in threaded relation with one of them.

3. A bushing having shank and flange parts, said bushing shank part having a keyway, a key positioned in said keyway and extending into the zone of said bushing flange part, said flange part having an opening receiving said extending key part, said key and bushing having aligned openings radially extending in said zone, and screw means arranged in said openings in threaded relation with said bushing and said key.

4. A bushing having shank and flange parts, said shank part being longitudinally split by a radially-through keyway, a key positioned in said keyway and extending radially beyond said shank part and longitudinally into the zone of said flange part, said flange part having an opening receiving said extending key part, said key and bushing having aligned openings radially extending in said zone, and means arranged in said opening to secure said key against longitudinal motion, said bushing flange part having peripheral continuity in the axial plane of said keyway.

JOHN N. BROWNING.